(12) United States Patent
McKnew et al.

(10) Patent No.: US 11,636,715 B2
(45) Date of Patent: Apr. 25, 2023

(54) USING DYNAMIC TRIGGERS IN DANGEROUS SITUATIONS TO VIEW SENSOR DATA FOR AUTONOMOUS VEHICLE PASSENGERS

(71) Applicant: GM Cruise Holdings LLC, San Francisco, CA (US)

(72) Inventors: Jennifer McKnew, San Francisco, CA (US); Anuj Kaul, Santa Clara, CA (US); Kunal Roy, San Francisco, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 121 days.

(21) Appl. No.: 16/726,443

(22) Filed: Dec. 24, 2019

(65) Prior Publication Data
US 2021/0192864 A1    Jun. 24, 2021

(51) Int. Cl.
 G07C 5/00    (2006.01)
 G05D 1/00    (2006.01)
 G05D 1/02    (2020.01)
 B60W 60/00    (2020.01)

(52) U.S. Cl.
 CPC .......... *G07C 5/008* (2013.01); *G05D 1/0088* (2013.01); *G05D 1/0276* (2013.01)

(58) Field of Classification Search
 USPC .......................................................... 701/24
 See application file for complete search history.

(56) References Cited

U.S. PATENT DOCUMENTS

| | | | |
|---|---|---|---|
| 10,216,189 B1* | 2/2019 | Haynes | G05D 1/0221 |
| 10,324,463 B1* | 6/2019 | Konrardy | G05D 1/0278 |
| 10,713,727 B1* | 7/2020 | Floyd | H04L 9/0637 |
| 2009/0074249 A1* | 3/2009 | Moed | G06V 20/582 |
| | | | 382/104 |
| 2010/0183192 A1* | 7/2010 | Fritsch | G06T 7/254 |
| | | | 701/469 |
| 2014/0074345 A1* | 3/2014 | Gabay | G07C 5/008 |
| | | | 701/33.9 |
| 2014/0368341 A1* | 12/2014 | Williams | G08B 27/005 |
| | | | 702/3 |
| 2016/0232790 A1* | 8/2016 | Massey | G08G 1/096716 |
| 2016/0378112 A1* | 12/2016 | Ljubuncic | B60W 30/16 |
| | | | 701/45 |
| 2017/0192428 A1* | 7/2017 | Vogt | G05D 1/0257 |
| 2018/0059669 A1* | 3/2018 | Madigan | H04W 4/38 |
| 2018/0300816 A1* | 10/2018 | Perl | G06Q 40/08 |
| 2019/0064815 A1* | 2/2019 | Haynes | G05D 1/0212 |
| 2019/0250621 A1* | 8/2019 | Ghannam | G08G 1/096741 |
| 2020/0139990 A1* | 5/2020 | Hiruma | B60W 50/0205 |

\* cited by examiner

*Primary Examiner* — Tyler D Paige
(74) *Attorney, Agent, or Firm* — Polsinelli PC

(57) ABSTRACT

A method, non-transitory computer readable medium, and system for receiving sensor data from one or more sensors disposed on an autonomous vehicle, determining whether a potentially dangerous event is detected in the environment around the autonomous vehicle, and providing automatically at least a portion of the sensor data to a user associated with the autonomous vehicle. The sensor data may comprise measurements associated with an environment around the autonomous vehicle. The determination of the potentially dangerous event may be based on the sensor data. The portion of the sensor data may be provided automatically in response to determining that the potentially dangerous event is detected.

17 Claims, 3 Drawing Sheets

USING DYNAMIC TRIGGERS IN DANGEROUS SITUATIONS TO VIEW SENSOR DATA FOR AUTONOMOUS VEHICLE PASSENGERS

BACKGROUND

1. Technical Field

The present technology relates to using sensor data from autonomous vehicle (AV) sensors and more particularly to using AV sensor data to detect potentially dangerous situations.

2. Introduction

Autonomous vehicles (AVs) are vehicles having computers and control systems that perform driving and navigation tasks that are conventionally performed by a human driver. As AV technologies continue to advance, ride-sharing services will increasingly utilize AVs to improve service efficiency and safety. However, for effective use in ride-sharing deployments, AVs will be required to perform many of the functions that are conventionally performed by human drivers, such as reacting to potentially dangerous situations.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
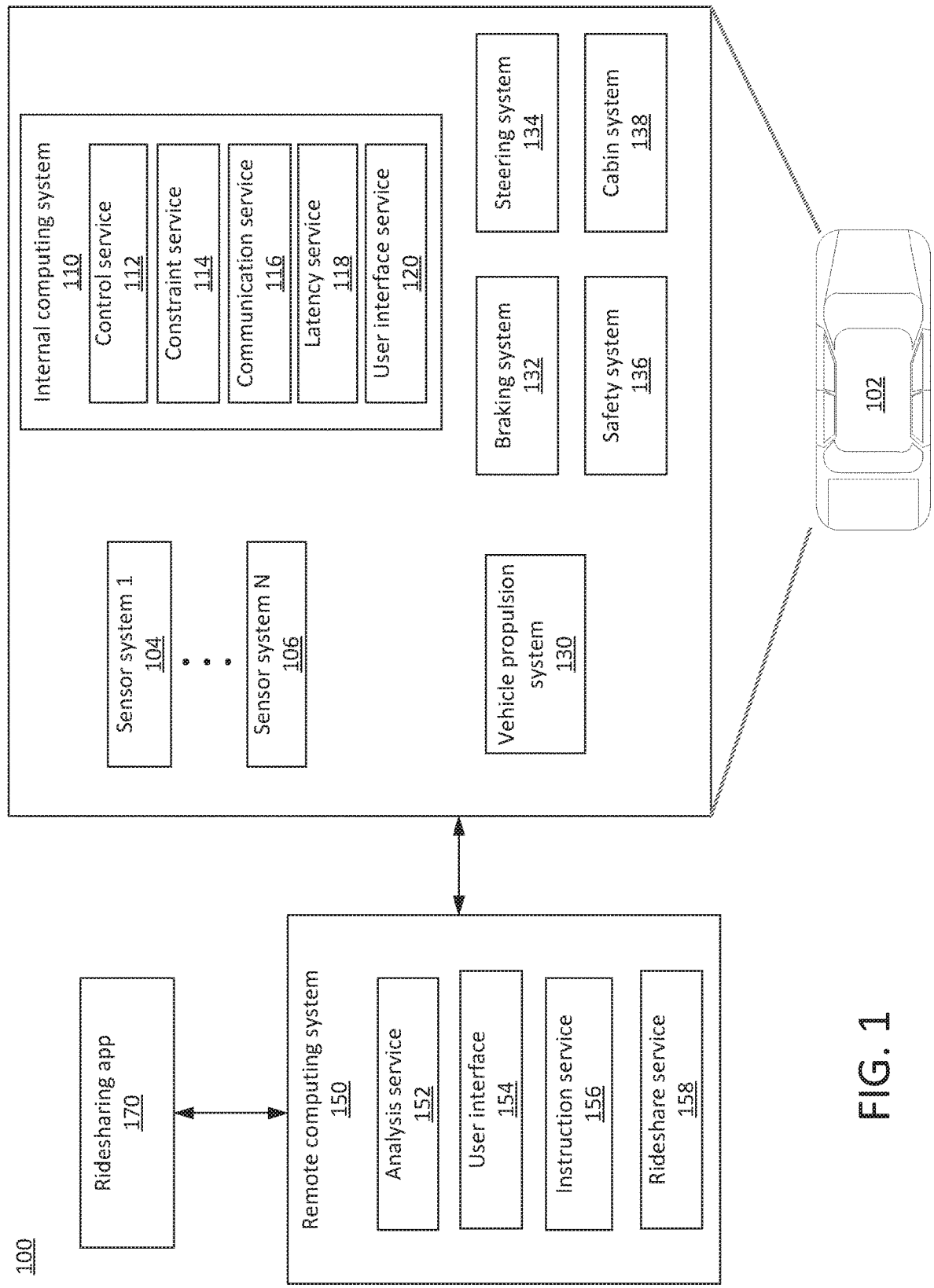
FIG. 1 shows an example of a content management system and client devices.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

An autonomous vehicle is a motorized vehicle that can navigate without a human driver. An exemplary autonomous vehicle includes a plurality of sensor systems, such as, but not limited to, a camera sensor system, a LiDAR sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

Using sensor data is integral to the safe operation of an autonomous vehicle. At some point, a processor of the autonomous vehicle may recognize that a dangerous event has occurred by processing sensor data gathered from sensors of the autonomous vehicle. While human drivers may use their senses to determine that a dangerous situation has occurred and react accordingly, it is challenging for autonomous vehicles to recognize that a dangerous event has occurred. Furthermore, it is also challenging to determine how to react accordingly to the dangerous event.

Using sensor data is integral to the safe operation of an autonomous vehicle. In traditional vehicles, human drivers are constantly using their senses to determine when dangerous events may occur. Similarly, upon detection of a dangerous event, human drivers can use their judgment to determine how to respond. In some instances, human drivers may also not detect the dangerous event. In such instances, the human drivers may not know how to respond.

For autonomous vehicles, it is challenging to determine when a dangerous event occurs. Furthermore, it is also challenging for autonomous vehicles to determine how to react accordingly to the dangerous event. Thus, the disclosed technology addresses the need in the art for an efficient process for detecting dangerous events and determining steps for the autonomous vehicle to take in response to the detected dangerous events. As will be discussed in further detail below, the autonomous vehicle may determine through various detected triggers that events may be potentially dangerous. The autonomous vehicle may then escalate these events to passengers or to remote assistance providers. The responses from the passengers or the remote assistance providers may then be used to train machine learning implementations.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system, and the Nth sensor system 106 may be a LiDAR sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 104-106 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control the operation of the vehicle propulsion system 130, the braking system 132, the steering system 134, the safety system 136, and the cabin system 138. The control service 112 receives sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing application 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 2:
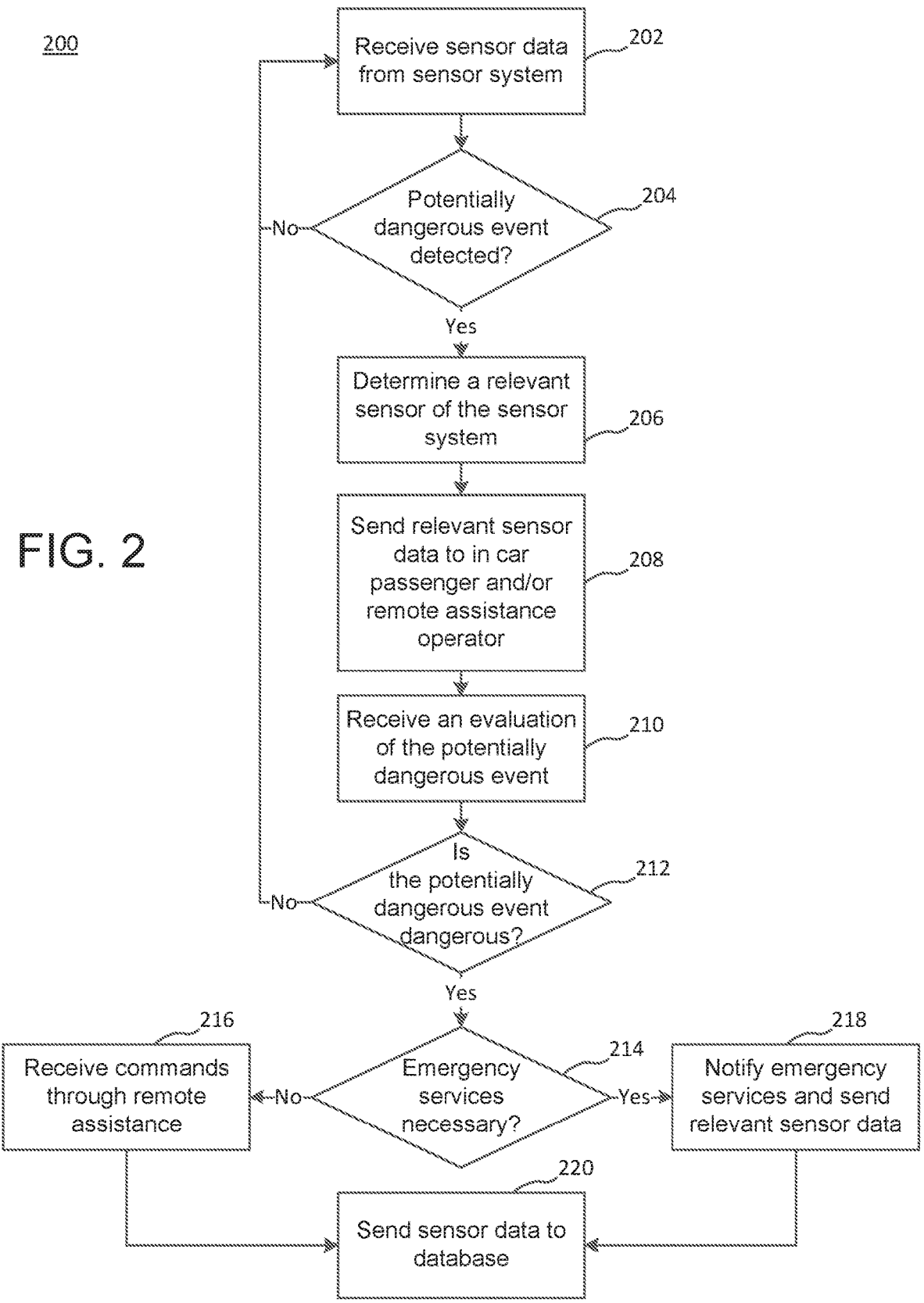
FIG. 2 is a flow diagram that illustrates an example process for using dynamic triggers to use sensor data.

FIG. 2 is a flow diagram that illustrates a process 200 for using dynamic triggers to use sensor data. While this process 200 may be implemented by various systems, this disclosure implements the process 200 through the internal computing system 110 for clarity and discussion purposes.

The process 200 begins with step 202, in which the internal computing system 110 receiving sensor data recorded or obtained by the sensor systems 104-106 of the autonomous vehicle 102. The sensor data may include measurements, images, and other data associated with the environment around the autonomous vehicle 102. As discussed above, the sensor systems 104-106 may include a camera sensor system capable of capturing an environment around the autonomous vehicle 102 as sensor data.

At step 204, the internal computing system 110 determines whether a potentially dangerous event is detected in the environment around the autonomous vehicle 102. More specifically, the internal computing system 110 may detect dynamic triggers captured in the sensor data to determine whether the potentially dangerous event has occurred. The dynamic triggers are events that may generally be associated with potentially dangerous events. For example, the internal computing system 110 may detect in sensor data captured by the camera sensor system a pedestrian outside of the autonomous vehicle 102 lying on a sidewalk with blood. The pedestrian lying on the sidewalk may be a trigger that is associated with the potentially dangerous event of a crime. As another example, the internal computing system 110 may detect in sensor data captured by a microphone a gunshot sound. The internal computing system 110 may then determine that the gunshot, a trigger, is associated with a shooting, a potentially dangerous event. Similarly, the internal computing system 110 may detect in sensor data captured by a camera a person approaching the autonomous vehicle 102 with a weapon (e.g. a gun, knife, sledgehammer, etc.). Thus, the internal computing system 110 may determine that the weapon, a trigger, is associated with a crime, a potentially dangerous event. In other words, the internal computing system evaluates detected triggers to determine whether an event is potentially dangerous.

In some embodiments, the potentially dangerous event may be any dangerous event on the road, involving any vehicle. In other words, the potentially dangerous event is not limited to the autonomous vehicle 102. For example, the internal computing system 110 may detect in sensor data captured by a camera a car accident occurring between two vehicles, neither of which are the autonomous vehicle 102.

In some embodiments, the internal computing system 110 may receive an alert communicating that an event is the potentially dangerous event. Thus, the potentially dangerous event may be communicated to the internal computing system 110. In other words, the internal computing system 110 may receive communicated data from some remote computing system. The internal computing system 110 may then further determine whether a potentially dangerous event is detected based on the communicated data. For example, the internal computing system 110 may receive from a third party, such as a police department, an AMBER alert for a specified license plate. Thus, the internal computing system 110 may optically detect in sensor data captured by the camera sensor system the specified license plate, the trigger, and determine that the vehicle with the specified license plate is a potentially dangerous event. As another example, the United States Geographical Survey regularly provides real-time data on earthquakes occurrences. The internal computing system 110 may receive communicated data in the form of a notice that an earthquake has occurred within the environment around the autonomous vehicle 102. The internal computing system 110 may then determine based on this communicated data that the potentially dangerous event (i.e. the earthquake) has occurred. In some embodiments, the internal computing system 110 may determine and/or verify, such as through a suspension system of the autonomous vehicle 102, that the earthquake has occurred. More specifically, the sensor data obtained through the suspension system of the autonomous vehicle 102 may be used to determine and/or verify that the earthquake has occurred within the environment around the autonomous vehicle 102. Similarly, the incoming or communicated data may be used as an additional verification layer to ensure that the surrounding environment is safe for the passenger to exit the autonomous vehicle 102. For example, the autonomous vehicle 102 may have first determine through sensor data obtained through the suspension system of the autonomous vehicle 102 that an earthquake has occurred. The internal computing system 110 may then receive the communicated data indicating that the earthquake occurred, but no significant damage or danger exists. Thus, the internal computing system 110 may determine whether the surrounding area is safe for the passenger to exit the autonomous vehicle 102.

If the internal computing system 110 determines that a potentially dangerous event is not detected in the sensor data gathered by the sensor systems 104-106, then the process 200 returns to step 202, in which the internal computing system 110 continues receiving sensor data from the sensor systems 104-106.

If the internal computing system 110 determines that a potentially dangerous event has been detected in the sensor data, then the process 200 continues to step 206. At step 206, in some embodiments, the internal computing system 110, in response to determining that the potentially dangerous event is detected, determines a relevant sensor of the sensor systems 104-106. The relevant sensor is the sensor that provides the most relevant information about the detected potentially dangerous event. For example, in the AMBER alert scenario above, the relevant sensor is the camera sensor system, not the microphone. Thus, the relevant sensor of the sensor systems 104-106 has gathered relevant sensor data associated with the potentially dangerous event.

Next, at step 208, the internal computing system 110 sends at least a portion of the sensor data to a user or passenger associated with the autonomous vehicle 102 to be displayed for the user or passenger to use. In some embodiments, the portion of the sensor data may be the relevant sensor data associated with the potentially dangerous event. For example, the internal computing system 110 may determine, based on images or videos obtained by the camera system, a person is trying to vandalize the autonomous vehicle 102. The internal computing system 110 may then send to the passenger, displaying via the user interface service 120, the real-time sensor data observed by the camera system of the autonomous vehicle 102, so that the passenger is aware that a potentially dangerous event is occurring.

It is further contemplated that the internal computing system 110 may augment or provide further detail to the potentially dangerous events by utilizing the sensor data obtained by other sensor systems 104-106. For example, the internal computing system 110 may detect, based upon impact sensors and the camera systems of the autonomous vehicle 102, that an impact has occurred to the autonomous vehicle 102 (i.e. a trigger) and that the impact was caused by another vehicle hitting the autonomous vehicle 102 (i.e. a potentially dangerous event). The internal computing system 110 may then send the images captured by the camera system to the passenger and depict, based on a computer generated projection, the impact location on the images so that the passenger is aware of the potentially dangerous event.

As another example, the internal computing system 110 may detect high wind conditions, which may be difficult for the passenger to understand visually. Thus, the internal computing system 110 may augment the camera data feed with computer generated images and information to depict the wind flowing.

In some embodiments, the internal computing system 110 sends, in response to determining that a potentially dangerous event is detected, a request for remote assistance from a remote assistance operator. The request may include the sensor data, so that the remote assistance operator is able to determine, without additional input from the passenger, the environment around the autonomous vehicle 102. In other words, the request may send sensor data to be displayed to remote assistance, so that remote assistance operator understands the situation.

At step 210, the internal computing system 110 receives an evaluation determining and/or indicating whether the potentially dangerous event is dangerous. In some embodiments, the user or passenger may evaluate whether the potentially dangerous event is a dangerous event. Similarly, in some embodiments, the remote assistance operator provides the evaluation indicating whether the potentially dangerous event is dangerous, such that the evaluation is received by the internal computing system 110 from the remote assistance. Thus, the evaluation may be used as a built-in redundancy to reduce a number of false positive detections of dangerous events by the internal computing system 110. In some embodiments, the internal computing system 110 may use the sensor data and the evaluation to train a machine learning algorithm that determines whether potentially dangerous events are dangerous events.

At step 212, the internal computing system 110 determines whether the potentially dangerous event is a dangerous event. As discussed above, the internal computing system 110 may rely on the evaluation to determine whether the potentially dangerous event is a dangerous event. In some embodiments, the machine learning algorithm may be sufficiently trained, in that there is a high enough confidence in determining whether potentially dangerous events are dangerous, to skip step 210 (i.e. receiving the evaluation). In other words, in these embodiments, the internal computing system 110 may determine, based upon the sensor data and the machine learning algorithm, whether the potentially dangerous event is dangerous.

If the internal computing system 110 determines that the potentially dangerous event is not a dangerous event, the process 200 returns to step 202, in which the internal computing system 110 continues receiving sensor data from the sensor systems 104-106 of the autonomous vehicle 102.

If the internal computing system 110 determines that the potentially dangerous event is a dangerous event, the process 200 continues to step 214. At step 214, the internal computing system 110 determines whether emergency services or authorities are necessary. In some embodiments, the evaluation received in step 210 may also determine whether emergency services are necessary. Similar to above, in some embodiments, the sensor data and the evaluation may be used to train a machine learning algorithm to categorize various types of potentially dangerous events. Furthermore, the machine learning algorithm may also be trained to then determine whether emergency services are necessary for each type of potentially dangerous event. Thus, in these embodiments, the machine learning algorithm may be sufficiently trained so that there is a high enough confidence in determining whether the event requires emergency services.

If the internal computing system 110 determines that emergency services are not necessary, the process 200 continues to step 216. At step 216, the internal computing system 110 receives commands through remote assistance. The commands are effective to allow limited control of the autonomous vehicle 102 from remote assistance. In other words, the commands allow remote assistance to control the autonomous vehicle 102. For example, remote assistance may determine that a crime is occurring and, while emergency services aren't necessary, the autonomous vehicle 102 should be locked, so that the passenger does not disembark directly into a crime scene. As another example, remote assistance may navigate an autonomous vehicle 102 that has low tire pressure to pull over.

If the internal computing system 110 determines that emergency services are necessary, the process 200 continues to step 218. At step 218, the internal computing system 110 notifies emergency services about the dangerous event. The internal computing system 110 may also send the relevant sensor data to emergency services to facilitate a faster and/or more efficient response.

From both step 216 and step 218, the process 200 continues to step 220, in which the internal computing system 110 may send the sensor data, the evaluation, and/or any combination of the various determinations above to a database of the remote computing system 150. In some embodiments, the internal computing system 110 may also send the evaluation to the remote computing system 150, which may store the evaluation and the relevant sensor data in a database. The database may then be used for queries to track incidents and provide additional data and/or evidence as needed. For example, in the AMBER alert scenario, the images of the vehicle with the specified license plate may be important for tracking and/or evidentiary purposes. Thus, a user may query the database for evaluation and tracking to inform police of sightings, locations, etc.

As discussed above, the sensor data, the evaluation, and/or any combination of the various determinations above may be used to train machine learning algorithms. More specifically, the remote computing system 150, using the analysis service 152, may develop these machine learning algorithms, as described above, to expedite and streamline process 200. For example, the remote computing system 150 may use sensor data and the respective evaluation to train a machine learning algorithm that determines whether events are potentially dangerous. In some embodiments, this may occur by flagging certain triggers of the events that are associated with being potentially dangerous.

It is further contemplated that the internal computing system 110 may receive, prior to detecting the potentially dangerous event, a communication from the passenger of the autonomous vehicle 102. The communication may indicate that the potentially dangerous event has occurred. Thus, the internal computing system 110 may then determine, based on the communication, that a potentially dangerous event has occurred and begin implementing the process 200 at step 206.

Figure 3:
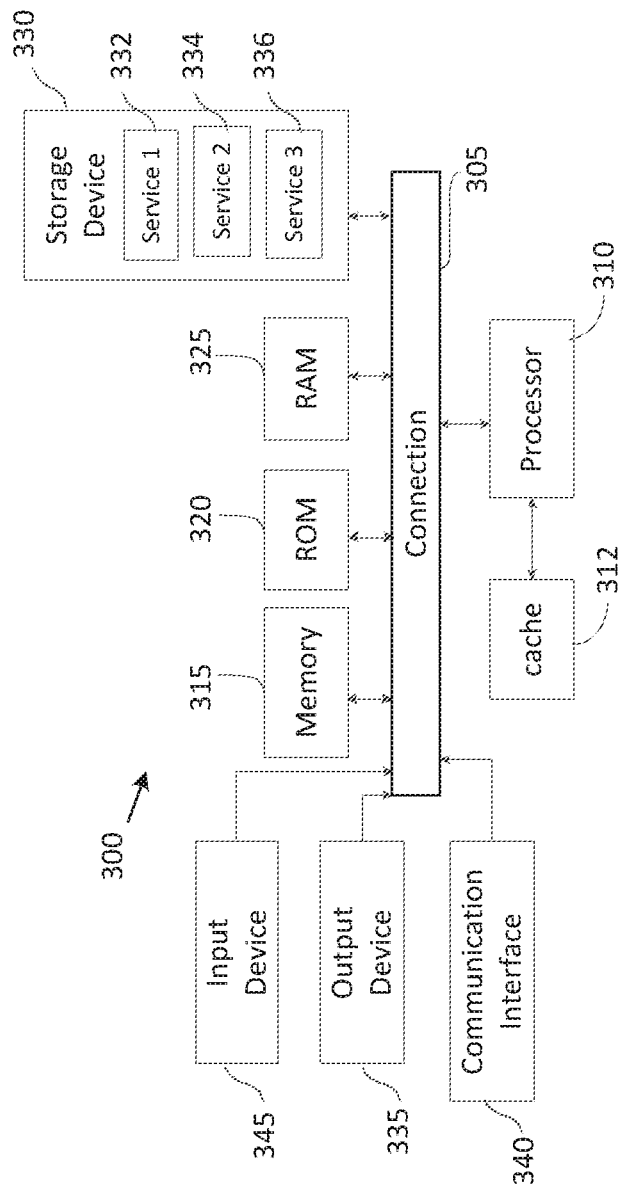
FIG. 3 shows an example of a system for implementing certain aspects of the present technology.

FIG. 3 shows an example of computing system 300, which can be for example any computing device making up internal computing system 110, remote computing system 150, (potential) passenger device executing rideshare app 170, or any component thereof in which the components of the system are in communication with each other using connection 305. Connection 305 can be a physical connection via a bus, or a direct connection into processor 310, such as in a chipset architecture. Connection 305 can also be a virtual connection, networked connection, or logical connection.

In some embodiments, computing system 300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 300 includes at least one processing unit (CPU or processor) 310 and connection 305 that couples various system components including system memory 315, such as read-only memory (ROM) 320 and random access memory (RAM) 325 to processor 310. Computing system 300 can include a cache of high-speed memory 312 connected directly with, in close proximity to, or integrated as part of processor 310.

Processor 310 can include any general purpose processor and a hardware service or software service, such as services 332, 334, and 336 stored in storage device 330, configured to control processor 310 as well as a special-purpose processor where software instructions are incorporated into the actual processor design. Processor 310 may essentially be a completely self-contained computing system, containing multiple cores or processors, a bus, memory controller, cache, etc. A multi-core processor may be symmetric or asymmetric.

To enable user interaction, computing system 300 includes an input device 345, which can represent any number of input mechanisms, such as a microphone for speech, a touch-sensitive screen for gesture or graphical input, keyboard, mouse, motion input, speech, etc. Computing system 300 can also include output device 335, which can be one or more of a number of output mechanisms known to those of skill in the art. In some instances, multimodal systems can enable a user to provide multiple types of input/output to communicate with computing system 300. Computing system 300 can include communications interface 340, which can generally govern and manage the user input and system output. There is no restriction on operating on any particular hardware arrangement, and therefore the basic features here may easily be substituted for improved hardware or firmware arrangements as they are developed.

Storage device 330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 330 can include software services, servers, services, etc., that when the code that defines such software is executed by the processor 310, it causes the system to perform a function. In some embodiments, a hardware service that performs a particular function can include the software component stored in a computer-readable medium in connection with the necessary hardware components, such as processor 310, connection 305, output device 335, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for dynamically providing sensor data obtained from a relevant sensor of a plurality of sensors to a user associated with an autonomous vehicle based on an environment around the autonomous vehicle, the method comprising:
    receiving the plurality of sensor data from the plurality of sensors disposed on the autonomous vehicle, wherein the plurality of sensor data comprises measurements associated with the environment around the autonomous vehicle;
    determining, based on the plurality of sensor data, an earthquake has occurred in the environment around the autonomous vehicle;
    determining, in response to determining that the earthquake has occurred in the environment around the autonomous vehicle and based upon sensor data that is associated with determining that the earthquake has occurred in the environment, a relevant sensor of the plurality of sensors, wherein the relevant sensor is a suspension system of the autonomous vehicle; and
    displaying, in response to determining that the earthquake has occurred in the environment, the sensor data obtained from the relevant sensor, wherein displaying the sensor data obtained from the relevant sensor includes computer generated images and information that augment the sensor data obtained from the relevant sensor.

2. The method of claim 1, further comprising:
    sending, in response to determining that the earthquake has occurred in the environment around the autonomous vehicle, a request for remote assistance, the request further including at least the portion of the sensor data obtained from the relevant sensor; and
    receiving an evaluation indicating a determination of an extent of damage or danger caused by the earthquake.

3. The method of claim 1, further comprising:
    receiving commands through remote assistance, the commands effective to allow limited control of the autonomous vehicle.

4. The method of claim 1, further comprising:
    receiving an alert communicating that the earthquake has occurred in the environment around the autonomous vehicle;
    notifying, upon determining that the earthquake has occurred in the environment around the autonomous vehicle, emergency services or authorities; and
    sending, to the emergency services or authorities, the sensor data obtained from the relevant sensor.

5. The method of claim 1, further comprising:
    sending, to a remote computing system, the sensor data obtained from the relevant sensor, wherein the sensor data obtained from the relevant sensor is used to train a machine learning algorithm that determines whether an impact of the earthquake is dangerous.

6. The method of claim 1, further comprising:
    receiving communicated data from a remote computing system, wherein determining that the earthquake has occurred in the environment around the autonomous vehicle is further based on the communicated data.

7. The method of claim 1, further comprising:
    receiving, prior to determining that the earthquake has occurred in the environment around the autonomous vehicle, a communication from a passenger of the autonomous vehicle, the communication indicating that the earthquake has occurred.

8. A non-transitory computer readable medium for dynamically providing sensor data obtained from a relevant sensor of a plurality of sensors to a user associated with an autonomous vehicle based on an environment around the autonomous vehicle, the non-transitory computer readable medium comprising instructions stored thereon, the instructions effective to cause at least one processor to:
    receive the plurality of sensor data from a plurality of sensors disposed on the autonomous vehicle, wherein the plurality of sensor data comprises measurements associated with the environment around the autonomous vehicle;
    determine, based on the plurality of sensor data, that an earthquake has occurred in the environment around the autonomous vehicle;
    determine, in response to determining that determining that the earthquake has occurred in the environment around the autonomous vehicle and based upon sensor data that is associated with determining that the earthquake has occurred in the environment, a relevant sensor of the plurality of sensors, wherein the relevant sensor is a suspension system of the autonomous vehicle; and
    display, in response to determining that the earthquake has occurred in the environment, the sensor data obtained from the relevant sensor, wherein displaying the sensor data obtained from the relevant sensor includes computer generated images and information that augment the sensor data obtained from the relevant sensor.

9. The non-transitory computer readable medium of claim 8, wherein the instructions are further effective to cause the at least one processor to:
    send, in response to determining that the earthquake has occurred in the environment around the autonomous vehicle, a request for remote assistance, the request further including at least the portion of the sensor data obtained from the relevant sensor; and
    receive an evaluation indicating a determination of an extent of damage or danger caused by the earthquake.

10. The non-transitory computer readable medium of claim 8, wherein the instructions are further effective to cause the at least one processor to:
    receive commands through remote assistance, the commands effective to allow limited control of the autonomous vehicle.

11. The non-transitory computer readable medium of claim 8, wherein the instructions are further effective to cause the at least one processor to:
    receive communicated data from a remote computing system, wherein determining that the earthquake has occurred in the environment around the autonomous vehicle is further based on the communicated data.

12. The non-transitory computer readable medium of claim 8, wherein the instructions are further effective to cause the at least one processor to:
    receive, prior to determining that the earthquake has occurred in the environment around the autonomous vehicle, a communication from a passenger of the autonomous vehicle, the communication indicating that the earthquake has occurred.

13. A system for dynamically providing sensor data obtained from a relevant sensor of a plurality of sensors to a user associated with an autonomous vehicle based on an environment around the autonomous vehicle, the system comprising:

at least one processor;

at least one memory storing computer-readable instructions that, when executed by the at least one processor, causes the at least one processor to:

receive the plurality of sensor data from the plurality of sensors disposed on the autonomous vehicle, wherein the plurality of sensor data comprises measurements associated with the environment around the autonomous vehicle;

determine, based on the plurality of sensor data, an earthquake has occurred in the environment around the autonomous vehicle;

determine, in response to determining that the earthquake has occurred in the environment around the autonomous vehicle and based upon sensor data that is associated with determining that the earthquake has occurred in the environment around the autonomous vehicle, a relevant sensor of the plurality of sensors, wherein the relevant sensor is a suspension system of the autonomous vehicle; and display, in response to determining that the earthquake has occurred in the environment, the sensor data obtained from the relevant sensor, wherein displaying the sensor data obtained from the relevant sensor includes computer generated images and information that augment the sensor data obtained from the relevant sensor.

14. The system of claim 13, wherein the instructions are effective to further cause the at least one processor to:

send, in response to determining that the earthquake has occurred in the environment around the autonomous vehicle, a request for remote assistance, the request further including at least the portion of the sensor data obtained from the relevant sensor;

and receive an evaluation indicating a determination of an extent of damage or danger caused by the earthquake.

15. The system of claim 13, wherein the instructions are effective to further cause the at least one processor to:

receive commands through remote assistance, the commands effective to allow limited control of the autonomous vehicle.

16. The system of claim 13, wherein the instructions are effective to further cause the at least one processor to:

receive communicated data from a remote computing system, wherein determining that the earthquake has occurred in the environment around the autonomous vehicle is further based on the communicated data.

17. The system of claim 13, wherein the instructions are effective to further cause the at least one processor to:

receive, prior to determining that the earthquake has occurred in the environment around the autonomous vehicle, a communication from a passenger of the autonomous vehicle, the communication indicating that the earthquake has occurred.

* * * * *